United States Patent
Lee et al.

(10) Patent No.: US 10,708,964 B2
(45) Date of Patent: Jul. 7, 2020

(54) METHOD AND DEVICE FOR FORMING APPLICATION SERVICE PLATFORM SESSION IN WIRELESS COMMUNICATION SYSTEM

(71) Applicant: LG ELECTRONICS INC., Seoul (KR)

(72) Inventors: Byungjoo Lee, Seoul (KR); Giwon Park, Seoul (KR); Dongcheol Kim, Seoul (KR); Youngjun Jo, Seoul (KR); Hyunhee Park, Seoul (KR); Taesung Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/748,587

(22) PCT Filed: Jul. 28, 2016

(86) PCT No.: PCT/KR2016/008276
§ 371 (c)(1),
(2) Date: Jan. 29, 2018

(87) PCT Pub. No.: WO2017/018823
PCT Pub. Date: Feb. 2, 2017

(65) Prior Publication Data
US 2018/0206279 A1   Jul. 19, 2018

Related U.S. Application Data

(60) Provisional application No. 62/198,689, filed on Jul. 30, 2015, provisional application No. 62/209,876, (Continued)

(51) Int. Cl.
*H04W 4/80* (2018.01)
*H04W 88/06* (2009.01)
(Continued)

(52) U.S. Cl.
CPC ........... *H04W 76/14* (2018.02); *H04L 67/104* (2013.01); *H04L 67/1044* (2013.01);
(Continued)

(58) Field of Classification Search
CPC ..... H04W 76/14; H04W 76/10; H04W 76/00; H04W 8/005; H04W 8/00; H04W 92/18;
(Continued)

(56) References Cited

U.S. PATENT DOCUMENTS 9,521,589 B2 * 12/2016 Lee ................... H04W 8/005
9,699,715 B2 * 7/2017 Kim ................... H04W 48/16
(Continued)

FOREIGN PATENT DOCUMENTS

JP      2014036292    2/2014
JP      2014168215    9/2014
(Continued)

OTHER PUBLICATIONS

PCT International Application No. PCT/KR2016/008276, Written Opinion of the International Searching Authority dated Dec. 5, 2016, 19 pages.

*Primary Examiner* — Jeffrey M Rutkowski
*Assistant Examiner* — Luna Weissberger
(74) *Attorney, Agent, or Firm* — Lee Hong Degerman Kang & Waimey

(57) ABSTRACT

The present specification may provide a method for forming, by a searcher terminal, an application service platform session with an advertiser terminal in a wireless communication system. The method for forming an application service platform session may comprise the steps of: performing discovery for the advertiser terminal and a first service; and forming an ASP session for the first service by performing connection with the advertiser terminal on the basis of a result of the performed discovery, wherein the discovery and (Continued)

the connection may be performed through at least one of multiple interfaces supported by application service platforms of the searcher terminal and the advertiser terminal when the searcher terminal and the advertiser terminal are first type terminals, and the discovery and the connection may be performed through a Wi-Fi direct interface when one of the searcher terminal and the advertiser terminal is the first type terminal and the other is a second type terminal.

6 Claims, 11 Drawing Sheets

Related U.S. Application Data filed on Aug. 25, 2015, provisional application No. 62/251,128, filed on Nov. 5, 2015.

(51) Int. Cl.
| | |
|---|---|
| *H04W 76/14* | (2018.01) |
| *H04W 76/10* | (2018.01) |
| *H04L 29/08* | (2006.01) |
| *H04W 92/18* | (2009.01) |
| *H04W 8/00* | (2009.01) |
| *H04W 84/12* | (2009.01) |

(52) U.S. Cl.
CPC ............ *H04L 67/141* (2013.01); *H04L 67/16* (2013.01); *H04W 8/005* (2013.01); *H04W 76/10* (2018.02); *H04W 92/18* (2013.01); *H04W 84/12* (2013.01)

(58) Field of Classification Search
CPC ..... H04W 92/16; H04W 92/00; H04W 84/12; H04W 84/10; H04W 84/02; H04L 67/16; H04L 67/00; H04L 67/141; H04L 67/14; H04L 67/1044; H04L 67/1042; H04L 67/104; H04L 67/10
USPC .......................................................... 370/338
See application file for complete search history.

(56) References Cited

U.S. PATENT DOCUMENTS

| | | | |
|---|---|---|---|
| 2006/0046736 A1 | 3/2006 | Pering et al. | |
| 2014/0334464 A1 | 11/2014 | Qi et al. | |
| 2015/0208225 A1* | 7/2015 | Yu | H04W 76/14 |
| | | | 370/329 |
| 2016/0073334 A1* | 3/2016 | Goto | H04L 67/16 |
| | | | 370/254 |
| 2016/0205199 A1* | 7/2016 | Patil | H04W 76/14 |
| | | | 709/223 |
| 2016/0360565 A1* | 12/2016 | Li | H04W 76/14 |

FOREIGN PATENT DOCUMENTS

| | | |
|---|---|---|
| JP | 2015023440 | 2/2015 |
| WO | 2014069868 | 5/2014 |
| WO | 2014107248 | 7/2014 |
| WO | 2014109513 | 7/2014 |
| WO | 2014182814 | 11/2014 |
| WO | 2015009097 | 4/2015 |

* cited by examiner

METHOD AND DEVICE FOR FORMING APPLICATION SERVICE PLATFORM SESSION IN WIRELESS COMMUNICATION SYSTEM

CROSS-REFERENCE TO RELATED APPLICATIONS

This application is the National Stage filing under 35 U.S.C. 371 of International Application No. PCT/KR2016/008276, filed on Jul. 28, 2016, which claims the benefit of U.S. Provisional Application No. 62/198,689, filed on Jul. 30, 2015, 62/209,876, filed on Aug. 25, 2015 and 62/251,128, filed on Nov. 5, 2015, the contents of which are all hereby incorporated by reference herein in their entirety.

TECHNICAL FIELD

The present invention relates to a wireless communication system, and more particularly, to a method and device for forming an application service platform (ASP) session in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of Bluetooth, NAN (neighboring awareness networking), and NFC (near field communication) is increasing. Hence, it is necessary to have a method of providing a service in environment in which a plurality of systems or interfaces are provided.

DISCLOSURE

Technical Problem

The present specification relates to a method and device for forming an ASP session in a wireless communication system.

An object of the present specification is to provide a method for forming an ASP session considering backward compatibility in a wireless communication system.

Another object of the present specification is to provide a method for forming an ASP session considering a discovery method and a connection method in a wireless communication system.

Other object of the present specification is to provide a method for forming an ASP session considering a type of a user equipment in a wireless communication system.

Technical Solution

In accordance with one embodiment of the present specification, a method for forming, by a seeker device, an application service platform (ASP) session with an advertiser device in a wireless communication system may be provided. The method for forming an ASP session in a wireless communication system comprises the steps of performing discovery for a first service with the advertiser device; and forming the ASP session for the first service by performing connection with the advertiser device on the basis of a result of the performed discovery. At this time, the discovery and the connection may be performed through at least any one of a plurality of interfaces supported by ASPs of the seeker device and the advertiser device when the seeker device and the advertiser device are first type devices, and the discovery and the connection may be performed through a Wi-Fi direct interface when one of the seeker device and the advertiser device is the first type device and the other is a second type device.

In accordance with another embodiment of the present specification, a seeker device for forming an application service platform (ASP) session with an advertiser device in a wireless communication system may be provided. The seeker device may comprise a reception module for receiving information from an external device; a transmission module for transmitting information to the external device; and a processor for controlling the reception module and the transmission module. The processor may perform discovery for a first service with the advertiser device and form the ASP session for the first service by performing connection with the advertiser device on the basis of a result of the performed discovery. At this time, the discovery and the connection may be performed through at least any one of a plurality of interfaces supported by ASPs of the seeker device and the advertiser device when the seeker device and the advertiser device are first type devices, and the discovery and the connection may be performed through a Wi-Fi direct interface when one of the seeker device and the advertiser device is the first type device and the other is a second type device.

Also, the followings may commonly be applied to the method and device for forming an ASP session in a wireless communication system.

In accordance with one embodiment of the present specification, the first type device may be a device operated based on ASP that supports the plurality of interfaces, and the second type device may be a device operated based on ASP that supports the Wi-Fi Direct interface only.

Also, in accordance with one embodiment of the present specification, the first service may be any one of send, play, display and print, and the discovery and the connection may be performed through the Wi-Fi Direct interface only if any one of the seeker device and the advertiser device is the first type device and the other is the second type device.

Also, in accordance with one embodiment of the present specification, the discovery and the connection may be performed through the Wi-Fi Direct interface regardless of types of the seeker device and the advertiser device if the first service is any one of send, play, display and print.

Also, in accordance with one embodiment of the present specification, the seeker device may perform service discovery for the first service by paging SeekService method when the seeker device is the first type device and the advertiser device is the second type device, and the SeekService method may include service name and service information, which are based on Wi-Fi Direct interface format.

Also, in accordance with one embodiment of the present specification, the SeekService method may further include service name and service information, which are based on mDNS (Multicast Domain Name System) format.

Also, in accordance with one embodiment of the present specification, the advertiser device may perform service advertisement for the first service by paging AdvertiserService method when the seeker device is the second type device and the advertiser device is the first type device, and the AdvertiserService method may include service name and service information, which are based on Wi-Fi Direct interface format.

Also, in accordance with one embodiment of the present specification, the AdvertiserService method may further include service name and service information, which are based on mDNS (Multicast Domain Name System) format.

Also, in accordance with one embodiment of the present specification, the first type device may include a Backward Compatibility Module (BC module).

At this time, in accordance with one embodiment of the present specification, the BC module may be module that performs mutual change between service name of the Wi-Fi Direct interface format and service name of the mDNS format.

Also, in accordance with one embodiment of the present specification, the BC module may be located in an APS end of the first type device.

Also, in accordance with one embodiment of the present specification, the BC module may be located in a service end of the first type device.

Advantageous Effects

The present specification may provide a method for forming an ASP session in a wireless communication system and a device therefor.

The present specification may provide a method for forming an ASP session considering backward compatibility with a legacy system in a wireless communication system.

The present specification may provide a method for forming an ASP session considering a discovery method and a connection method in a wireless communication system.

The present specification may provide a method for forming an ASP session considering a type of a user equipment in a wireless communication system.

Effects obtainable from the present invention may be non-limited by the above mentioned effect. And, other unmentioned effects can be clearly understood from the following description by those having ordinary skill in the technical field to which the present invention pertains.

BEST MODE FOR CARRYING OUT THE INVENTION

Figure 1:
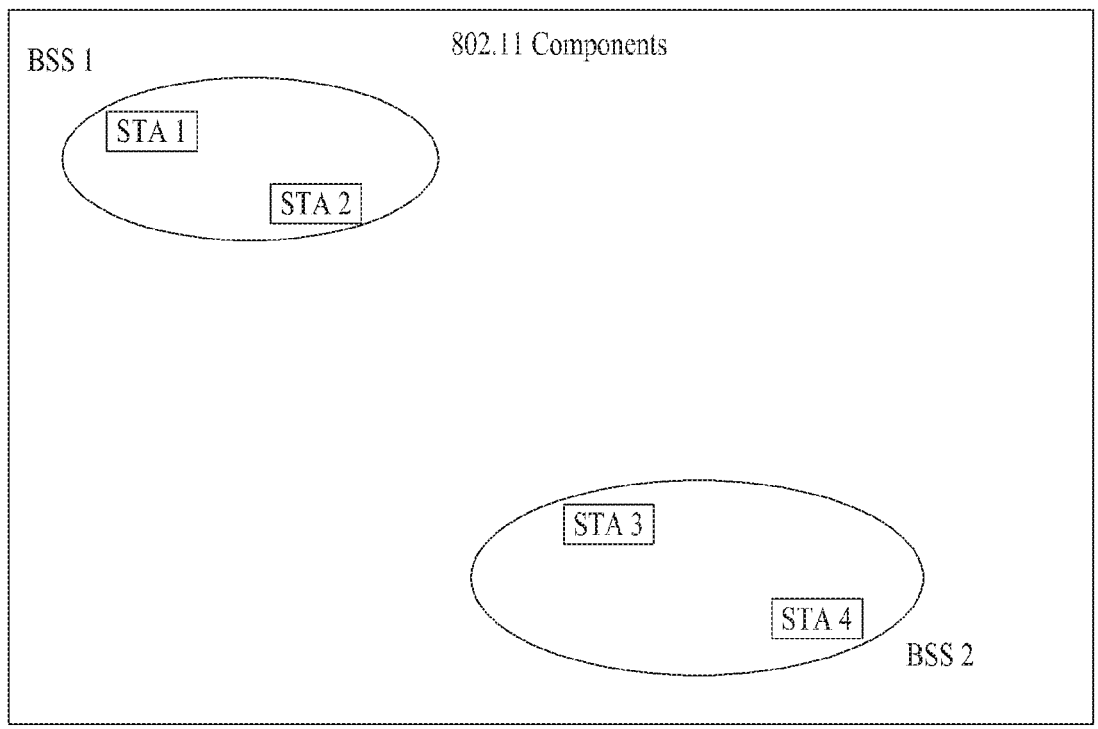
FIG. 1 is a diagram for an example of a structure of IEEE 802.11 system to which the present invention is applicable.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
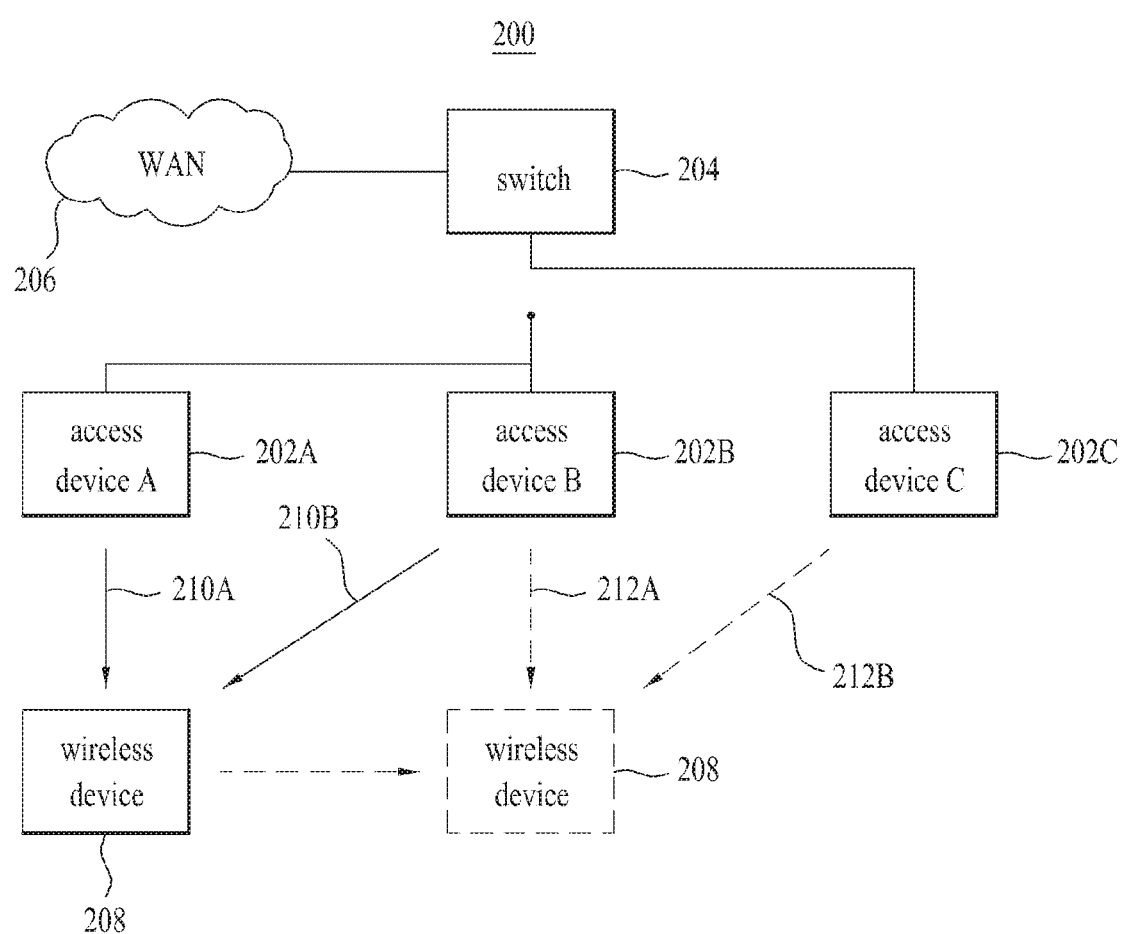
FIG. 2 is a block diagram for an example of operations of a communication system adopting access devices and wireless user devices.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
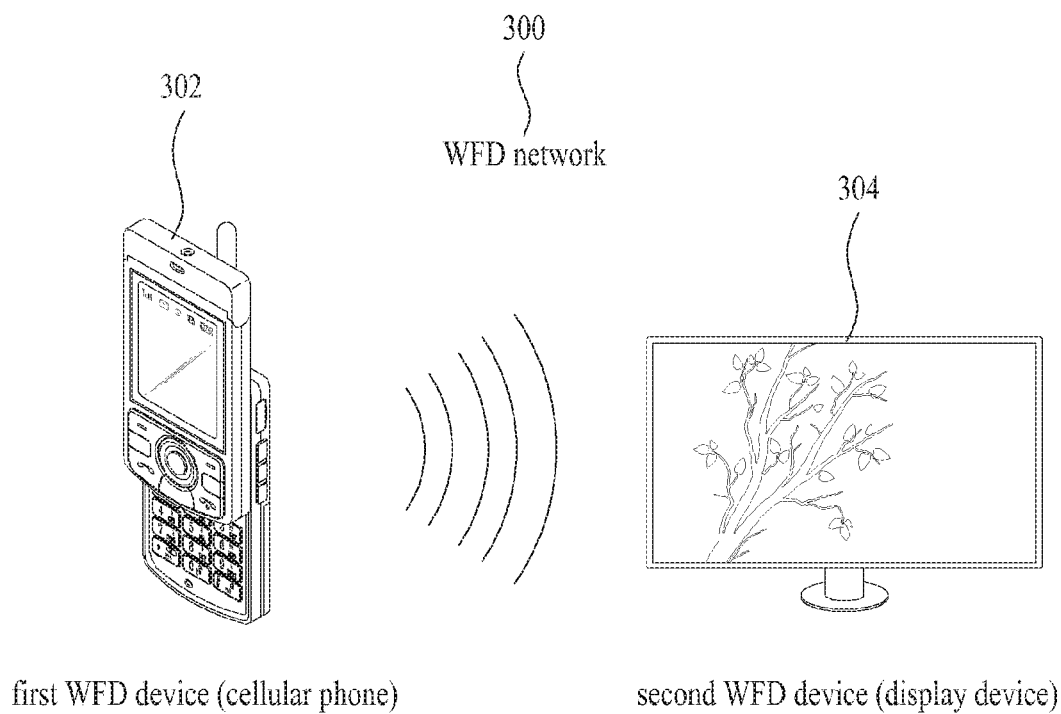
FIG. 3 is a diagram for an example of a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
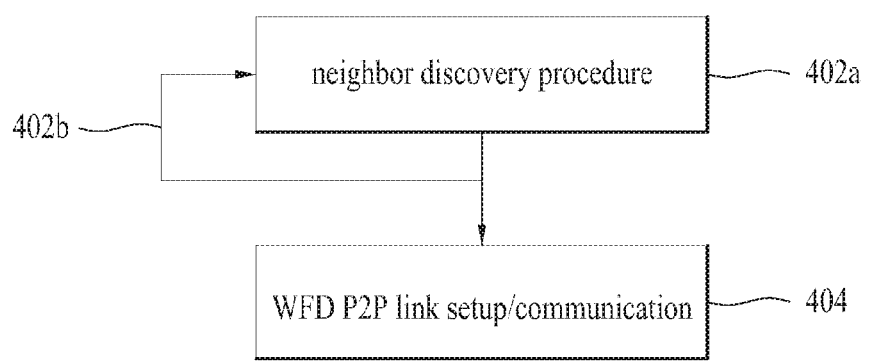
FIG. 4 is a flowchart for an example of a process of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
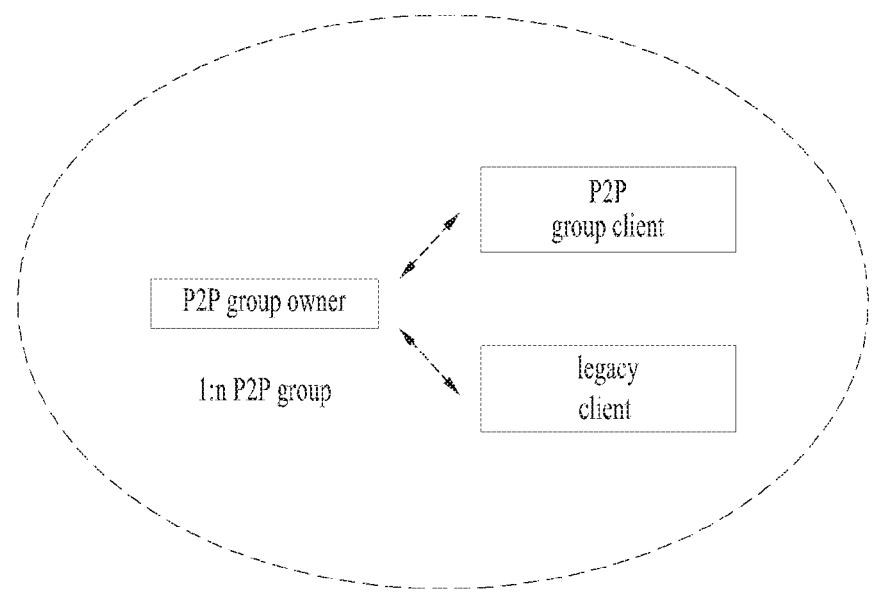
FIG. 5 is a diagram for a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
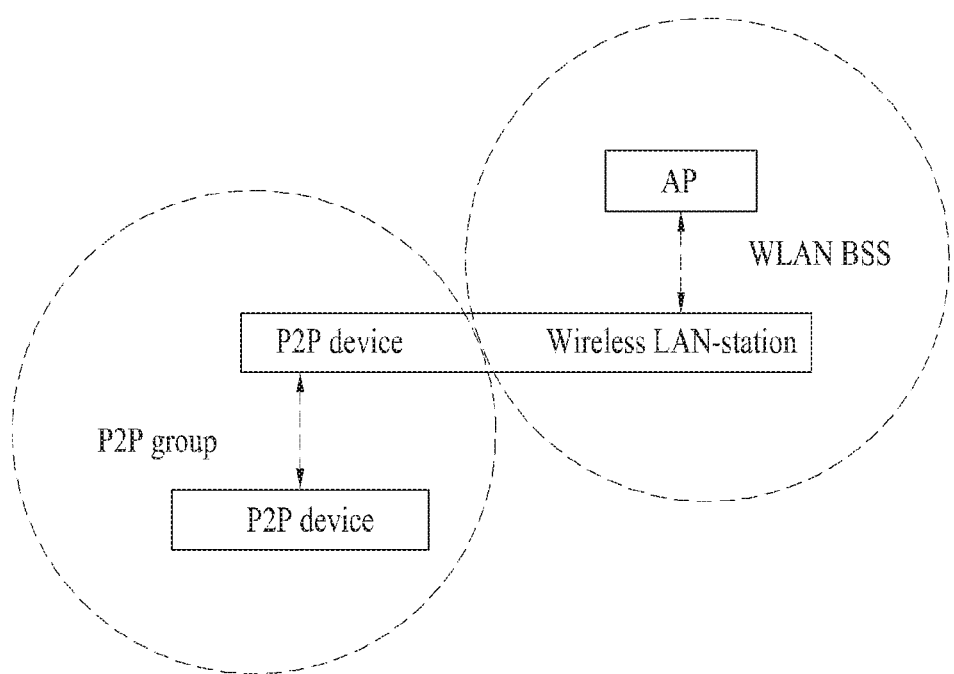
FIG. 6 is a diagram for a situation that a single P2P device forms a P2P group and is connected with an AP in a manner of operating as an STA of WLAN at the same time.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
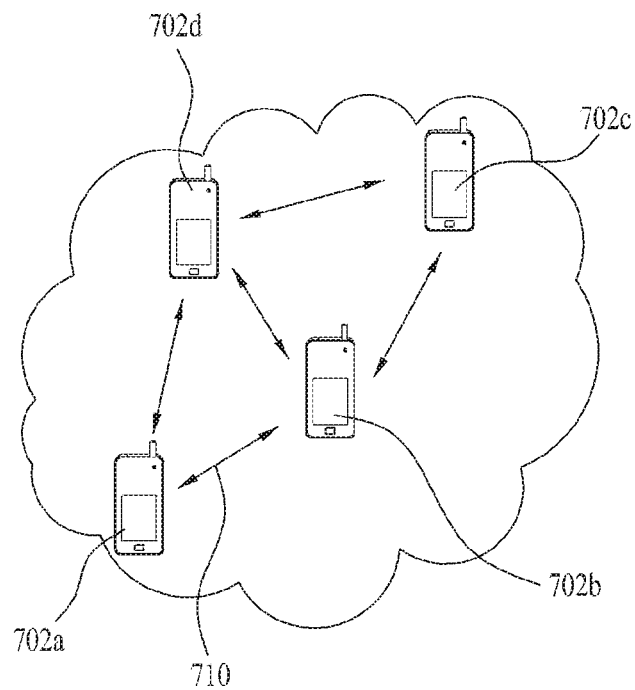
FIG. 7 is a diagram for a WFD network aspect in case that P2P is applied.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
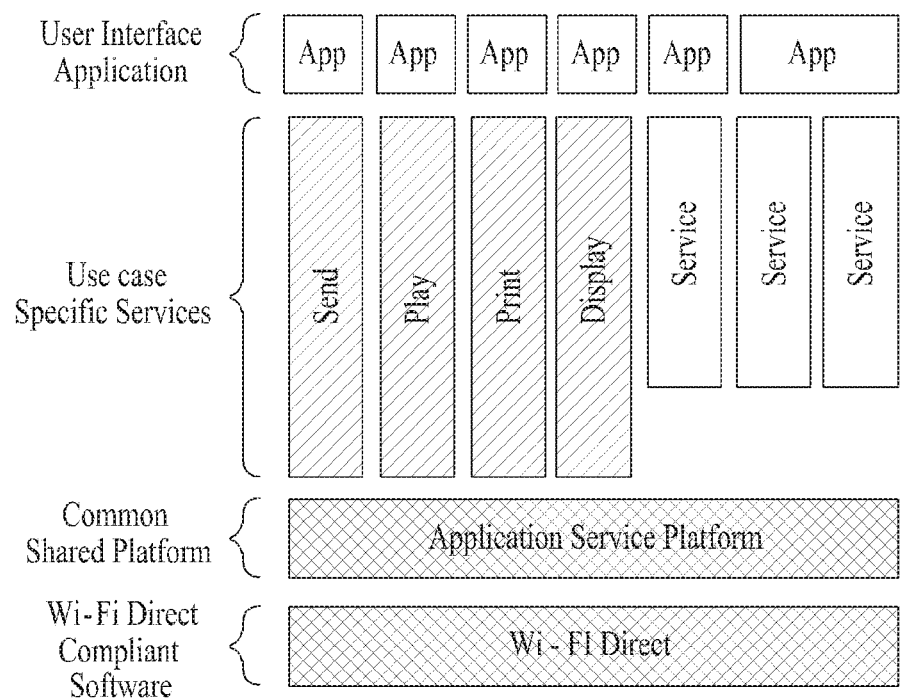
FIG. 8 is a simplified block diagram for a WFDS (Wi-Fi Direct services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
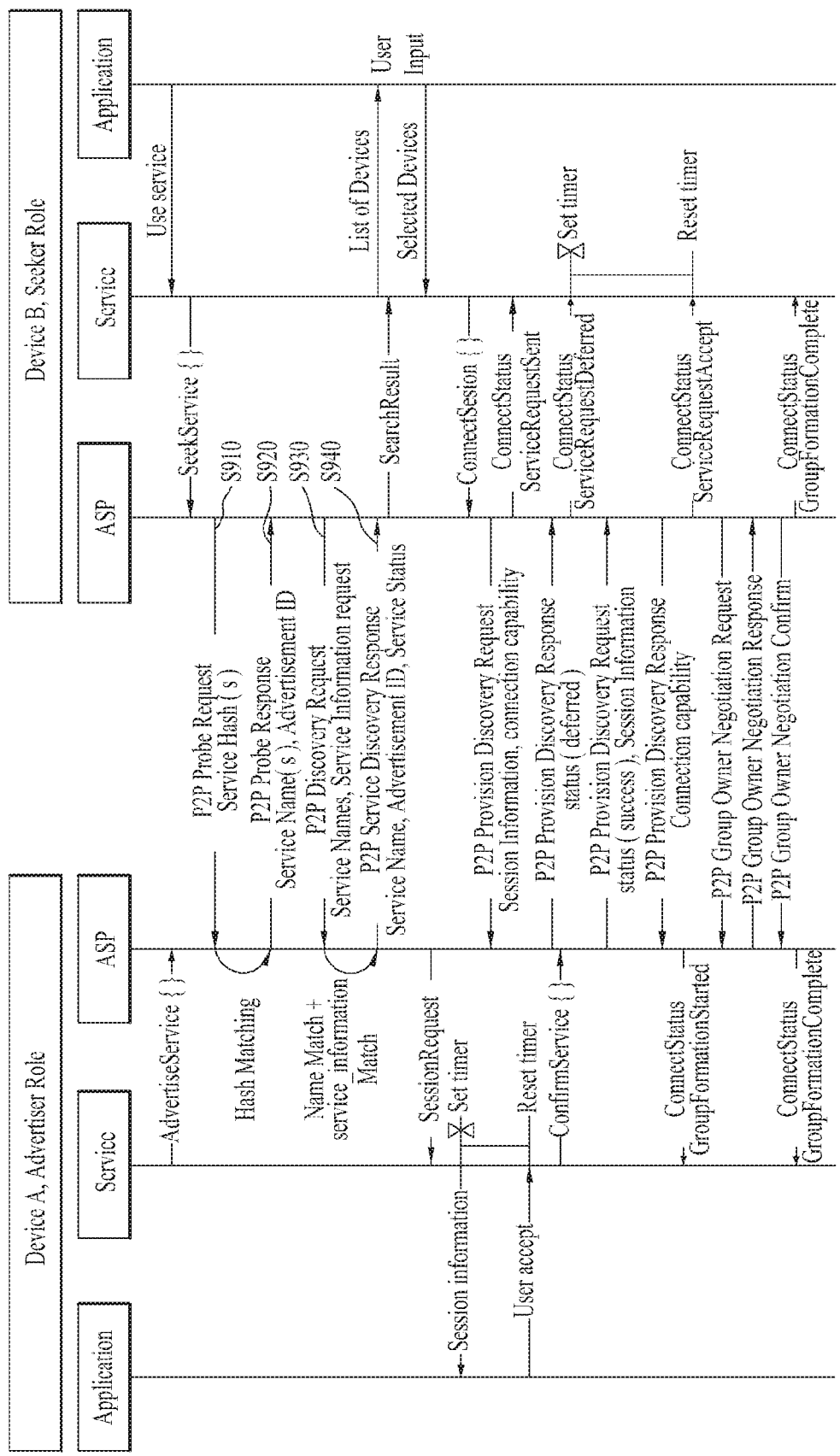
FIG. 9 is a flowchart for a process of establishing a WFDS session by discovering a device and a service between WFDS devices in a legacy WFDS.

FIG. 9 is a flowchart for a process of establishing a WFDS session by discovering a device and a service between WFDS devices in a legacy WFDS.

For clarity, as shown in FIG. 9, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

In order to find out the target device to use the WFDS, the ASP end of the device B transmits a P2P (peer to peer) probe request message [S910]. In this case, the P2P probe request message includes a service name, which is intended to be found out by the ASP end of the device B or is capable of being supported by the ASP end of the device B, in a service hash form in a manner of hashing the service name. Having received the P2P probe request message from the seeker, if the device A supports the corresponding service, the device A transmits a P2P probe response message to the device B in response to the P2P probe request message [S920]. The P2P probe response message includes a service supported by a service name or a hash value and a corresponding advertise ID value. This procedure corresponds to a device discovery procedure indicating that the device A and the device B are WFDS devices. It is able to know whether a service is supported via the device discovery procedure.

Subsequently, it is able to know a specific service in detail via a P2P service discovery procedure, optionally. The device B, which has found a device capable of performing a WFDS with the device B, transmits a P2P service discovery request message to the device [S930]. Having received the P2P service discovery request message from the device B, the ASP end of the device A transmits a P2P service discovery response message to the device B in a manner of matching the service advertised by the service end of the device A with a P2P service name and a P2P service information received from the device B with each other [S940]. In this case, a GAS protocol defined by IEEE 802.11u is used. As mentioned in the foregoing description, when a request for a service search is completed, the device B can inform an application and a user of a search result. At this point, a group of Wi-Fi Direct is not formed yet. If a user selects a service and the selected service performs a connect session, P2P group formation is performed.

In the following, a method of configuring an ASP operating based on at least one selected from the group consisting of WFA, WFDS, Wi-Fi Direct, NAN (Neighbor Awareness Networking), NFC (Near Field Communication), and BLE (Bluetooth Low Energy) is disclosed as an embodiment of the present invention. In this case, the WFDS and the like may correspond to an interface. In particular, the interface may correspond to a method of supporting an operation of a device. In the following, a method for an ASP to interwork with a device/service discovery based on the interfaces is explained in detail.

In this case, for example, among the aforementioned interfaces, the BLE may correspond to a Bluetooth transmission/reception scheme in a form of using a frequency of 2.4 GHz and reducing power consumption. In particular, in order to quickly transmit and receive data of extremely small capacity, it may use the BLE to transmit data while reducing power consumption.

And, for example, the NAN (neighbor awareness networking) network may correspond to NAN devices using a set of the same NAN parameters (e.g., a time period between continuous discovery windows, a period of a discovery window, a beacon interval, a NAN channel, etc.). The NAN devices can configure a NAN cluster. In this case, the NAN cluster uses a set of the same NAN parameters and may correspond to a set of NAN devices synchronized with the same window schedule. A NAN device belonging to the NAN cluster can directly transmit a multicast/unicast NAN service discovery frame to a different NAN device within a range of a discovery window.

And, for example, the NFC may operate on a relatively low frequency band such as 13.56 MHz. In this case, if two P2P devices support the NFC, it may optionally use an NFC channel. A seeker P2P device can discover a P2P device using the NFC channel. When an NFC device is discovered, it may indicate that two P2P devices agree on a common channel for forming a group and share provisioning information such as a password of a device.

A method of interworking via an ASP for the aforementioned interfaces is explained in detail in the following. In this case, although the abovementioned configurations are proposed as an interface capable of being interlocked with the ASP, this is an example only. It may support a different interface as well, by which the present invention may be non-limited.

Figure 10:
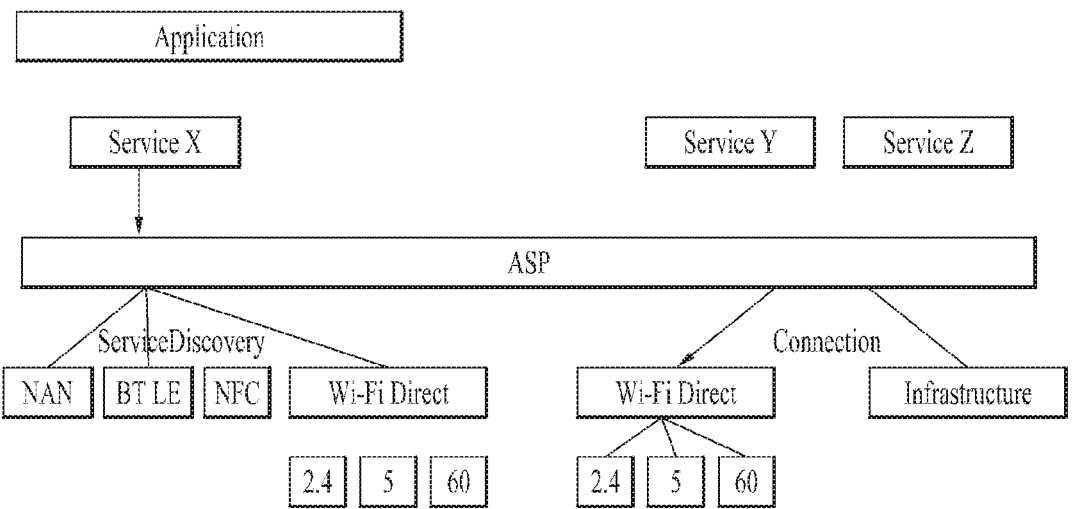
FIG. 10 is a diagram for an application service platform (ASP) supporting a plurality of interfaces.

FIG. 10 is a diagram for a application service platform (ASP) supporting a plurality of interfaces As mentioned in the foregoing description, a service end of an advertiser device corresponding to a device supporting WFDS advertises a service capable of being provided by the service end and a service end of a seeker device corresponding to a different device supporting the WFDS can indicate an ASP end to search for a target device for which the service is to be used. In particular, it may be able to support the WFDS between devices via the ASP.

In this case, referring to FIG. 10, the ASP can support a plurality of interfaces. In this case, for example, the ASP can support a plurality of interfaces for performing service discovery. And, the ASP can support a plurality of interfaces for performing service connection.

In this case, for example, a plurality of the interfaces for performing the service discovery may correspond to at least one selected from the group consisting of Wi-Fi Direct, NAN (Neighbor Awareness Networking), NFC (Near Field Communication), BLE (Bluetooth Low Energy), and WLAN Infrastructure.

And, a plurality of the interfaces for performing the service connection may correspond to at least one selected from the group consisting of Wi-Pi Direct, P2P, and Infrastructure. And, for example, the ASP can support a plurality of frequency bands. In this case, for example, a plurality of the frequency bands may correspond to 2.4 GHz, 5 GHz, 60 GHz, and the like. And, for example, the ASP can support information on a frequency band less than 1 GHz. In particular, the ASP can support a plurality of frequency band and is not restricted to a specific frequency band.

Referring to FIG. 10, a first device can perform device discovery or service discovery on a first service using the ASP. Subsequently, if searching for the device discovery or the service discovery is completed, it may perform service connection based on a search result. In this case, for example, an interface used for performing the service discovery may be different from an interface used for performing the service connection. The interfaces can be selected from among a plurality of interfaces.

In this case, the ASP may use information or a parameter for supporting a plurality of the interfaces.

Regarding the ASP, for example, a service end of a device can obtain information on a service discovery method capable of supporting the first service and a connection method from the ASP. In this case, the first service may correspond to a service provided by the device and is not restricted to a specific service.

The service end of the device can call AdvertiseService( ) or SeekService( ) method to the ASP based on the information obtained from the ASP. In particular, similar to a legacy ASP operation, the device can use the ASP as an advertiser or a seeker to perform service discovery on the first service. After the service discovery is performed on the first service, the device can perform service connection based on a result of the service discovery. In this case, the service connection may correspond to a P2P or a WLAN infrastructure. In this case, for example, since both the service connections support a plurality of frequency bands, the service connection can be performed on the basis of a preferred band.

At this time, as an example, the service discovery method and the connection method are as listed in Table 1 below.

TABLE 1

| Connectivity methods | P2P | Multiband information | 2.4, 5, 60 GHz | |
|---|---|---|---|---|
| | Infrastructure information | | BSSID | |
| | | Multiband information | 2.4, 5, 60 GHz | Channel Index per band |
| Service Discovery methods | | | NAN | |
| | | | BTLE | |
| | | | NFC | |
| | | | Infrastructure | |
| | P2P | Multiband information | 2.4, 5, 60 GHz | |

Hereinafter, a method for performing service discovery and service connection by means of a UE considering backward compatibility will be described. At this time, a UE that supports an ASP, which uses a plurality of interfaces such as Wi-Fi Direct, NAN, NFC, BLE 및 WLAN Infrastructure as described above, may be a first type UE. That is, the first type UE may perform service discovery and service connection through the plurality of interfaces on the basis of the ASP.

Also, the UE which performs service discovery and service connection by using only the existing Wi-Fi Direct interface (or peer to peer interface, P2P interface) as the aforementioned WFDS UE may be a second type UE. Hereinafter, a method for forming an ASP session considering the first type UE and the second type UE will be described.

Figure 11:
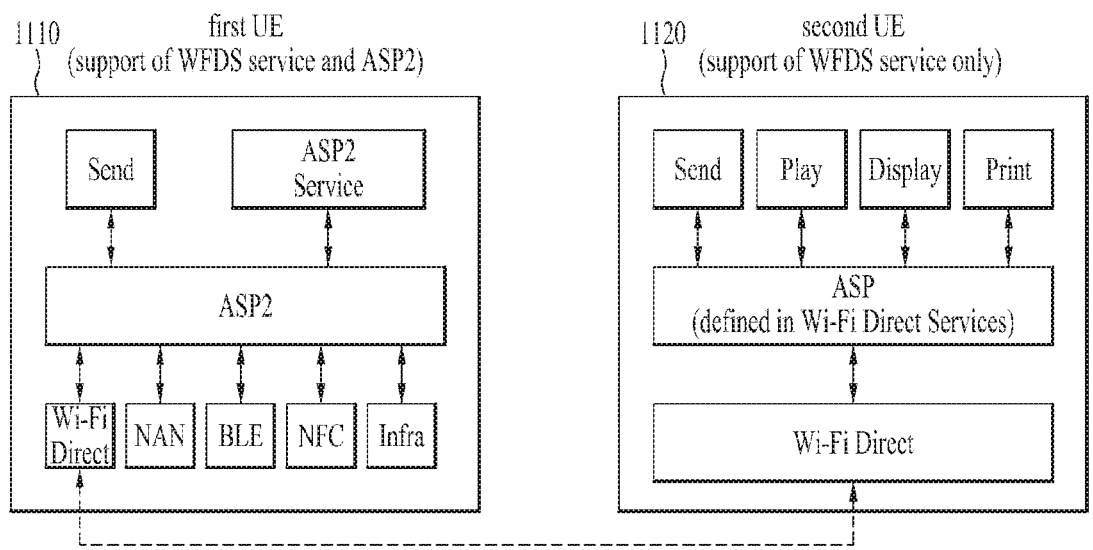
FIG. 11 is a diagram for a method for forming an ASP session considering a type of a UE.

FIG. 11 is a diagram for a method for forming an ASP session considering a type of a UE.

As described above, the UE may perform discovery for device/service and service connection by using the discovery result.

In more detail, the service end of the seeker device may page the aforementioned SeekService( ) method to the ASP end. At this time, the seeker device may discover the advertiser device, which supports a matched service, on the basis of the paged method.

At this time, if the seeker device is a first type UE, the seeker device may perform discovery by using any one of the plurality of interfaces. For example, the seeker device may perform discovery through a probe request frame on the basis of Wi-Fi Direct interface. Also, as an example, the seeker device may perform discovery by using NAN management frame or service discovery frame on the basis of NAN interface. Also, as an example, the seeker device may perform discovery by using BLE advertising packet on the basis of BLE interface. Also, as an example, the seeker device may perform discovery by using NFC connection handover request/select message on the basis of NFC interface. Also, as an example, the seeker device may perform discovery by using mDNS query/response packet on the basis of infrastructure.

That is, if the seeker device is a first type UE, the seeker device may perform discovery through a discovery method suitable for a corresponding interface by using any one of the plurality of interfaces.

On the other hand, if the seeker device is a second type UE, the seeker device may perform discovery through a probe request frame on the basis of Wi-Fi Direct interface.

Also, the service end of the advertising device may page AdvertiseService( ) method to the APS end. At this time, the advertising device may determine whether to support a service on the basis of the paged method. Afterwards, the advertising device may transmit a response message to the seeker device.

At this time, as an example, if the advertising device is a first type UE, the advertising device may transmit the response message to the seeker device on the basis of an interface for the message received from the seeker device. That is, the advertising device may transmit the response message on the basis of the interface used by the seeker device.

On the other hand, if the advertising device is a second type UE, the advertising device may transmit the response message on the basis of Wi-Fi Direct interface. That is, the advertising device may transmit a probe response message to the seeker device on the basis of the Wi-Fi Direct interface only if a probe request message is received.

Afterwards, the seeker device may identify whether to support a matched service by exchanging a service discovery request frame and a service response frame with the advertising device and establish an ASP session for the supported service.

For example, as described above, the seeker device may be any one of the first type UE and the second type UE. Also, the advertising device may be any one of the first type UE and the second type UE. At this time, the seeker device and the advertising device may need to select the service discovery method and the service connection method on the basis of the device type of the other party and the supported service.

Referring to FIG. 11, the first UE 1110 may be a first type UE (which supports a plurality of interfaces). Also, the second UE 1120 may be a second type UE (which supports Wi-Fi Direct interface only). For example, if the first UE 1110 is a seeker device, the second UE 1120 may be an advertiser device. Also, if the first UE 1110 is an advertiser device, the second UE 1120 may be a seeker device. That is, any one of the first UE 1110 and the second UE 1120 may be a seeker device, and the other one may be an advertiser device. At this time, since the first UE 1110 and the second UE 1120 have their respective device types different from each other, negotiation of the service discovery method and the service connection method may be required. At this time, as an example, if the first UE 1110 and the second UE 1120 perform service discovery and service connection, the first UE 1110 and the second UE 1120 may perform service discovery and service connection by using the Wi-Fi Direct interface only. That is, if any one of the first UE 1110 and the second UE 1120 is a first type and the other one is a second type, the first UE 1110 and the second UE 1120 may be defined to use the Wi-Fi Direct interface only.

Also, as an example, the first UE 1110 and the second UE 1120 perform service discovery and service connection for a first service only by using the Wi-Fi Direct interface. At this time, the first service may be any one of send, play, display and print. That is, the Wi-Fi Direct interface may be used only if any one of the seeker device and the advertiser device is a first type and the other one is a second type and an ASP session for the first service is formed.

At this time, as an example, if the two UEs form an ASP session through service discovery and service connection for the first service and both the two device types are the first types, service discovery and service connection may be performed using any one of the plurality of interfaces supported by the ASP.

That is, service discovery and service connection for the first service (send, play, display and print) as a specific service are performed considering backward compatibility, and the Wi-Fi Direct interface may be used as a specific interface only if any one device is a first type and the other device is a second type.

Also, as an example, if service discovery and service connection for the first service (send, play, display and print) are performed, the Wi-Fi Direct interface may only be used regardless of the device types of the seeker device and the advertiser device. For example, since the first service may be a service supported by the Wi-Fi Direct interface, for uniformity of device operation, service discovery and service connection may be performed for the first service through only the Wi-Fi Direct interface regardless of the device types.

Also, as an example, if the first UE 1110 which is a first type and the second UE 1120 which is a second type perform service discovery and service connection for the first service, information included in the method which is paged may be configured differently.

For example, the advertiser device may page AdvertiseService( ) method as described above. At this time, the AdvertiseService( ) method may be as listed in Table 2 below. In more detail, the AdvertiseService( ) method may include at least any one of Service type, Instance name, Service Information, Service Status, auto accept, Discovery Mechanism, Preferred connection and Preferred Connection Setting as a parameter.

TABLE 2

| ASPAdvertiseService ( ) |
|---|
| service_type |
| instance_name |
| service_information |

TABLE 2-continued

| ASPAdvertiseService ( ) |
|---|
| service_status |
| auto_accept |
| discovery_mechanism |
| preferred_connection |
| preferred_connection_settings |

At this time, as an example, the advertiser device may be a first type UE, and may perform service discovery for the first service. At this time, since the first service is a specific service supported by the aforementioned second type UE, a parameter value included in the AdvertiseService ( ) method may be set differently considering the second type UE.

For example, the service type may include a service name for the second type UE. At this time, the service name for the second type UE may be set to "org.wi-fi.wfds.xxx.tx". For example, if the first service is a send service, the service name may be "org.wi-fi.wfds.send.tx". Also, the service name for the first type UE may be set to "_xxx._tcp.local". For example, if the first service is a send service, the service name may be "_send._tcp.local". That is, the service name for the first type UE operated based on the ASP that supports a plurality of interfaces may be set differently from the service name for the second type operated based on the ASP that supports the Wi-Fi Direct interface only.

At this time, as an example, if the advertiser device pages the AdvertiseService( ) method to perform advertisement for the first service even though the advertiser device is the first type UE, "org.wi-fi.wfds.xxx.tx" may be included in the service name. That is, as a format used in the second UE, the service name may be included.

Also, as an example, if the advertiser device is the first type UE, service information is DNS (Domain Name System) record type, and include information on services as pointer (PTR) record, service (SRV) record and text (TXT) record formats. At this time, if the advertiser device pages the AdvertiseService( ) method to perform advertisement for the first service even though the advertiser device is the first type UE, service information may be included based on a format of service information set to the second type UE not the aforementioned DNS record type.

Also, as an example, the discovery mechanism may be information indicating an interface in which service discovery is performed based on the ASP that supports a plurality of interfaces. At this time, as an example, if the advertiser device is the first type UE and pages the AdvertiseService( ) method to perform advertisement for the first service, the discovery mechanism may be set to a value indicating the Wi-Fi Direct interface.

Also, as an example, preferred connection and preferred connection setting may indicate an interface in which service connection is performed based on the ASP that supports a plurality of interfaces and interface related information. At this time, as an example, if the advertiser device is the first type UE and pages the AdvertiseService( ) method to perform advertisement for the first service, preferred connection may be set to a value indicating the Wi-Fi Direct interface. Also, preferred connection setting may include information on the Wi-Fi Direct interface.

That is, even in the case that the advertiser device pages the AdvertiseService( ) method on the basis of the ASP that supports a plurality of interfaces as the first type UE, if the advertiser device advertises the service for the second type UE as the first service, a parameter may be configured as an information type for the Wi-Fi Direct interface.

Also, as an example, the seeker device may page Seek-Service( ) method as described above. At this time, the SeekService( ) method may be as listed in Table 3 below. In more detail, the SeekService( ) method may include at least any one of Service type, Service Information Request, Discovery Mechanism, Preferred connection and Preferred Connection Setting as a parameter.

TABLE 3

ASPSeekService( )

service_type
service_information_request
discovery_mechanism
preferred_connection
preferred_connection_setting At this time, as an example, the seeker device may be the first type UE, and may perform service discovery for the first service. At this time, since the first service is a specific service supported by the aforementioned second type UE, a parameter value included in the SeekerService ( ) method may be set differently considering the second type UE.

For example, the service type may include a service name for the second type UE. At this time, the service name for the second type UE may be set to "org.wi-fi.wfds.xxx.tx". For example, if the first service is a send service, the service name may be "org.wi-fi.wfds.send.tx". Also, the service name for the first type UE may be set to "_xxx._tcp.local". For example, if the first service is a send service, the service name may be "_send._tcp.local". That is, the service name for the first type UE operated based on the ASP that supports a plurality of interfaces may be set differently from the service name for the second type operated based on the ASP that supports the Wi-Fi Direct interface only.

At this time, as an example, if the seeker device pages the SeekService( ) method to search for the first service even though the advertiser device is the first type UE, "org.wi-fi.wfds.xxx.tx" may be included in the service name. That is, as a format used in the second UE, the service name may be included.

Also, as an example, if the seeker device is the first type UE, service information is a DNS (Domain Name System) record type and may include information on services as pointer (PTR) record, service (SRV) record and text (TXT) record formats. At this time, if the seeker device pages the SeekService( ) method to perform search for the first service even though the seeker device is the first type UE, service information may be included based on a format of service information set to the second type UE not the aforementioned DNS record type.

Also, as an example, the discovery mechanism may be information indicating an interface in which service discovery is performed based on the ASP that supports a plurality of interfaces. At this time, as an example, if the seeker device is the first type UE and pages the SeekService( ) method to search for the first service, the discovery mechanism may be set to a value indicating the Wi-Fi Direct interface.

Also, as an example, preferred connection and preferred connection setting may indicate an interface in which service connection is performed based on the ASP that supports a plurality of interfaces and interface related information. At this time, as an example, if the seeker device is the first type UE and pages the SeekService( ) method to perform search for the first service, preferred connection may be set to a value indicating the Wi-Fi Direct interface. Also, preferred connection setting may include information on the Wi-Fi Direct interface.

That is, in FIG. 11, for the first UE 1110, parameters of AdvertiseService ( ) and SeekService ( ) methods may be set based on the format of the ASP that supports a plurality of interfaces. However, if a service (send, play, display and print) matched with the second UE 1120 exists, parameters may be set based on the Wi-Fi Direct interface and a session for the ASP may be formed as described above.

Figure 12:
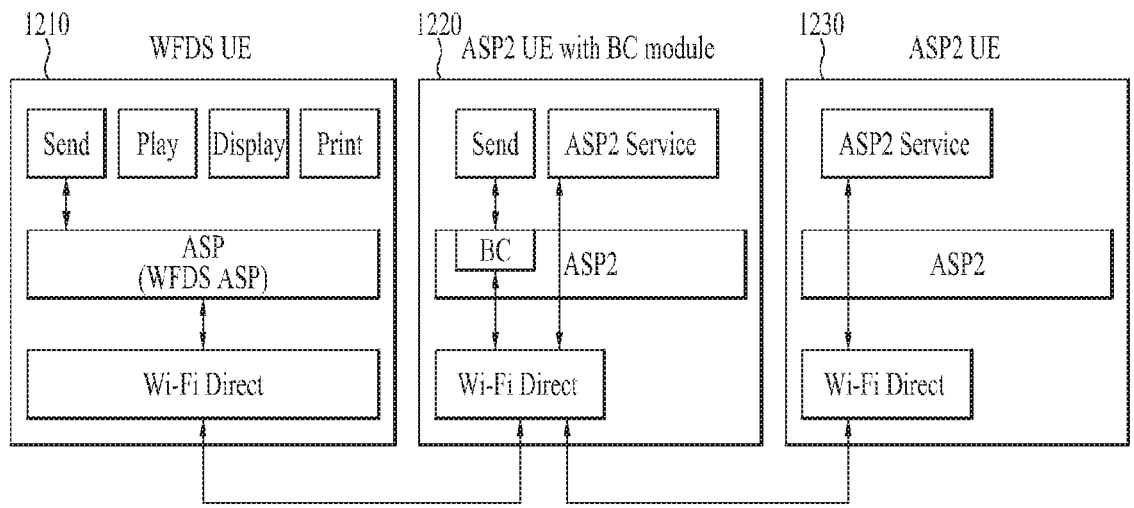
FIG. 12 is a diagram for a method for forming an ASP session on the basis of a backward compatibility module located in an ASP end.
Figure 13:
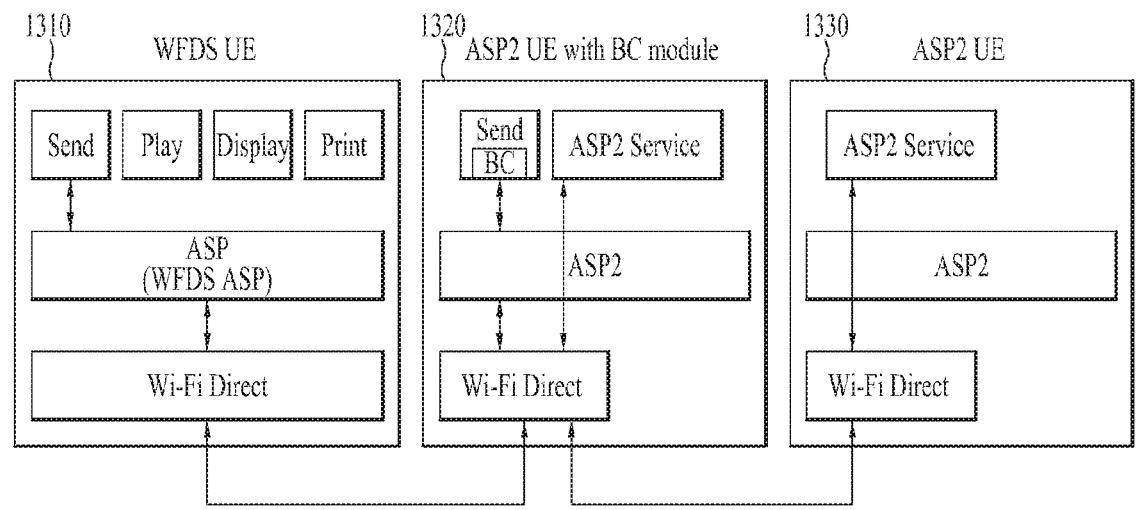
FIG. 13 is a diagram for a method for forming an ASP session on the basis of a backward compatibility module located in a service end.

FIGS. 12 and 13 are diagrams for a method for forming an ASP session on the basis of a backward compatibility module located in an ASP end.

As described above, if any one of the seeker device and the advertiser device is a first type device and the other one is a second type device, service discovery and service connection for the first service (send, play, display and print) may be performed by using the Wi-Fi Direct interface only. At this time, as an example, service name and service information may be defined by only a format used in the Wi-Fi Direct interface as described above.

At this time, as an example, a backward compatibility (BC) module may be set to the first type UE (operated based on ASP that supports a plurality of interfaces). At this time, the BC module may change service name (WFDS service name) used in Wi-Fi direct to mDNS (Multicast DNS) service name format, or vice versa. That is, the BC module may be set to the first type UE to support a service of the Wi-Fi Direct interface as a legacy service, thereby supporting method and event.

Also, as an example, the first type UE may include a mapping table for changing WFDS service name to mDNS service name on the basis of the BC module. That is, the first type UE may change a format for a corresponding service name on the basis of a mapping table value.

At this time, as an example, in case of the first type seeker device, the first type seeker device may select a standard service name. At this time, the first type seeker device may set WFDS service name to the standard service name and perform service discovery on the basis of the set standard service name. For example, the first type seeker device may restrictively discover the second type advertiser device only by performing service discovery on the basis of the WFDS service name.

Also, the first type seeker device may set mDNS service name to the standard service name and perform service discovery on the basis of the set standard service name. For example, the first type seeker device may restrictively discover the first type advertiser device only on the basis of the mDNS service name.

Also, the first type seeker device may perform service discovery by using both the WFDS service and the mDNS service name. At this time, the first type seeker device may discover all types of advertiser devices corresponding to service name. That is, the first type seeker device may select a necessary service name by changing the service name to a service name mapping table on the basis of the BC module. Afterwards, the first type seeker device may perform service discovery on the basis of the selected service name.

Also, in case of the first type advertiser device, the first type advertiser device may select a standard service name. At this time, the first type advertiser device may set WFDS service name to the standard service name and perform service discovery on the basis of the set standard service name. For example, the first type advertiser device may restrictively perform advertisement for the second type seeker device only.

Also, the first type advertiser device may set mDNS service name to the standard service name and perform service discovery on the basis of the set standard service name. For example, the first type advertiser device may restrictively perform for service advertisement for the first type seeker device only on the basis of the mDNS service name.

Also, the first type advertiser device may perform service discovery by using both the WFDS service and the mDNS service name. Therefore, the first type advertiser device may perform advertisement for service both the first type seeker device and the second type seeker device. That is, the first type advertiser device may select a necessary service name by changing the service name to a service name mapping table on the basis of the BC module. Afterwards, the first type advertiser device may perform service advertisement for service discovery on the basis of the selected service name.

For example, referring to FIG. 12, WFDS UE 1210 may be a second type UE and ASP2 UEs 1220 and 1230 may be first type UEs. At this time, the BC module may be located in an ASP end of the ASP 2 UE 1220. That is, if a method for a first service (send, play, display and print) is paged, the ASP 2 UE 1220 may change service name and service information included in the method to be suitable for Wi-Fi Direct interface format. At this time, the ASP 2 UE 1220 may information changed by the Wi-Fi Direct interface to the WFDS UE 1210 through the Wi-Fi Direct interface by including the information in a frame. Also, as an example, if the ASP 2 UE pages another service except the first service, the ASP 2 UE 1220 may perform service discovery and service connection for the other ASP 2 UE 1230 on the basis of the mDNS service name without using the BC module.

For another example, referring to FIG. 13, WFDS UE 1310 may be a second type UE and ASP2 UEs 1320 and 1330 may be first type UEs. At this time, as an example, the BC module may be located in a service end. That is, the ASP 2 UE 1320 may perform advertisement or discovery for the first service (send, play, display and print) in the name of WFDS service through the BC module. That is, WFDS service and service information based on a format of Wi-Fi Direct interface may already be included in method which is paged. At this time, the ASP 2 UE 1320 may transmit a frame to the WFDS UE 1310 through the Wi-Fi Direct interface on the basis of the method which is paged. Also, as an example, if the ASP 2 UE 1320 pages another service except the first service, the ASP 2 UE 1320 may perform service discovery and service connection for the other ASP 2 UE 1330 on the basis of the mDNS service name without using the BC module.

That is, the BC module may be located in the service end or the service end. At this time, if the ASP 2 UE (or the first type UE) performs service discovery and service connection for the first service (send, play, display and print), the ASP 2 UE may perform service discovery and service connection on the basis of the BC module by including information for service in a format of the Wi-Fi Direct interface as described above.

Figure 14:
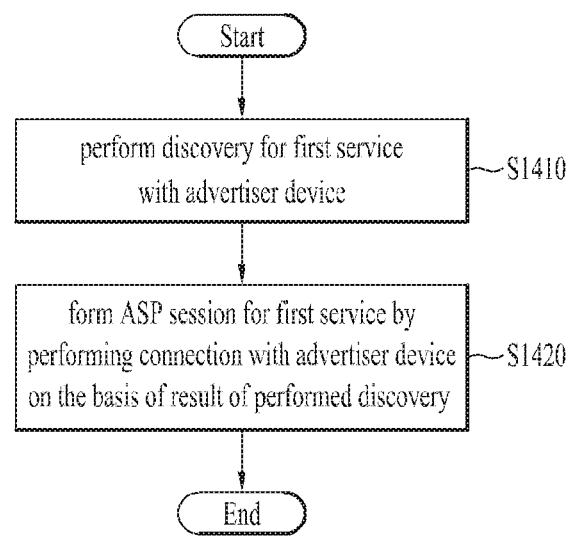
FIG. 14 is a diagram for a method for forming an ASP session in accordance with one embodiment of the present specification.

FIG. 14 is a diagram for a method for forming an ASP session in accordance with one embodiment of the present specification.

The seeker device may perform discovery for the first service together with the advertiser device (S1410). At this time, as described with reference to FIGS. 10 to 13, the first service may be any one of send, play, display and print. If any one of the seeker device and the advertiser device is the first type UE (which supports ASP operated based on a plurality of interfaces) and the other one is the second type UE (which supports ASP operated based on the Wi-Fi Direct interface), discovery for the first service may be performed using the Wi-Fi Direct interface only as described above.

Next, the seeker device may perform connection on the basis of the result of discovery performed with the advertiser device and form ASP session for the first service. At this time, as described in FIGS. 10 to 13, if any one of the seeker device and the advertiser device is the first type UE and the other one is the second type UE, connection for the first service and ASP session formation may be performed using the Wi-Fi Direct interface only as described above.

Figure 15:
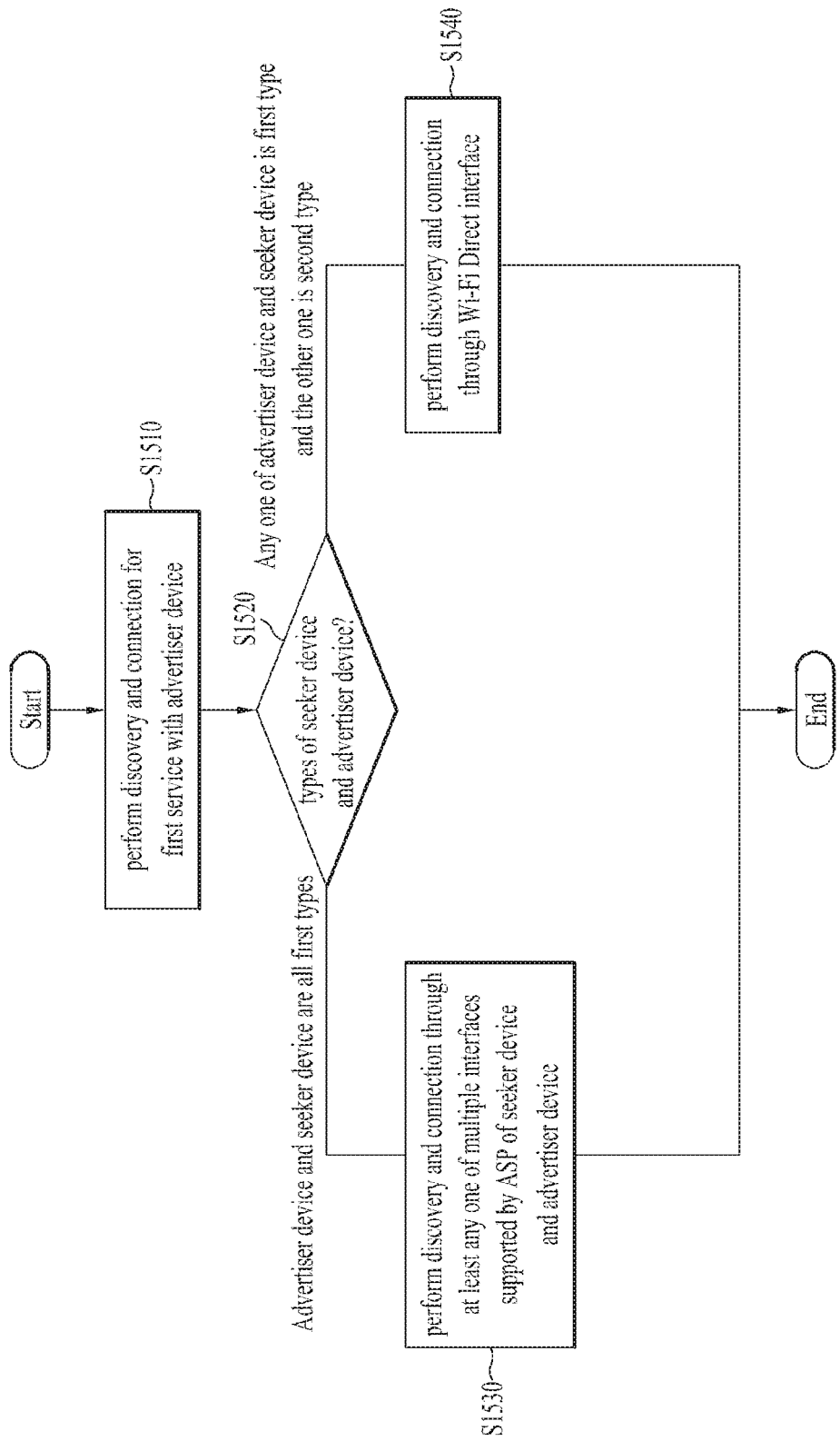
FIG. 15 is a diagram for a method for forming an ASP session in accordance with one embodiment of the present specification.

FIG. 15 is a diagram for a method for forming an ASP session in accordance with one embodiment of the present specification.

The seeker device may perform discovery and connection for the first service together with the advertiser device (S1510). At this time, as described with reference to FIGS. 10 to 14, the seeker device and the advertiser device may form the ASP session on the basis of discovery and connection.

At this time, an interface in which discovery and connection are performed may be set differently based on types of the seeker device and the advertiser device (S1520).

If the advertiser device and the seeker device are all the first type UEs (which support ASP operated based on a plurality of interfaces), discovery and connection may be performed through at least any one of the plurality of interfaces supported by the ASPs of the seeker device and the advertising device (S1530). At this time, as described in FIGS. 10 to 14, since the ASPs of the seeker device and the advertiser device support a plurality of interfaces, the ASPs may select one of the plurality of interfaces and perform discovery and connection for the first service. Afterwards, the advertiser device and the seeker device may form ASP session for the first service.

Next, if any one of the seeker device and the advertiser device is the first type and the other one is the second type, discovery and connection may be performed through the Wi-Fi Direct interface (S1540). At this time, as described in FIGS. 10 to 14, the first service may be any one of send, play, display and print. Also, the second type UE may be a device that supports ASP operated based on the Wi-Fi Direct interface. That is, if the seeker device and the advertiser device have their respective device types different from each other, discovery and connection for the first service may be performed using the Wi-Fi Direct interface only considering backward compatibility as described above.

Figure 16:
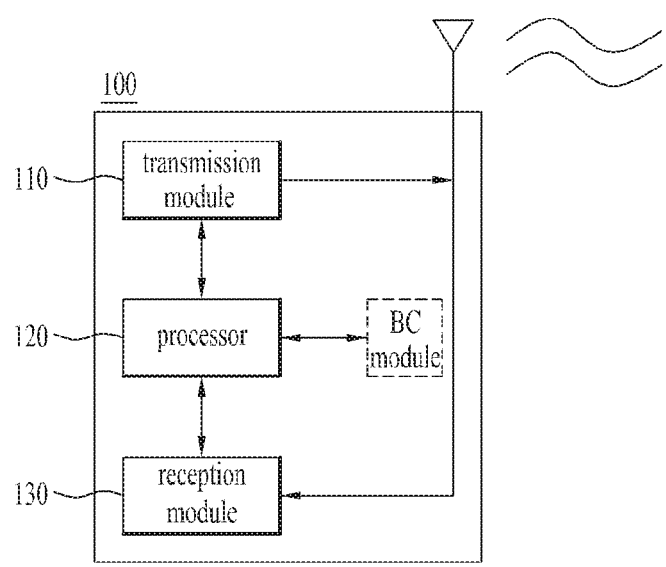
FIG. 16 is a block diagram for a UE according to one embodiment of the present specification.

FIG. 16 is a block diagram for a UE according to one embodiment of the present specification.

The UE may be a device that supports ASP which may use a plurality of interfaces (the first type device). Alternatively, the UE may be a device that supports ASP which may use Wi-Fi Direct interface (the second type device). At this time, the UE 100 may include a transmission module 110 for transmitting a radio signal, a reception module 130 for receiving the radio signal, and a processor 120 for controlling the transmission module 110 and the reception module 130. At this time, the UE 100 may perform communication with an external device by using the transmission module 110 and the reception module 130. For another example, the external device may be a base station. That is, the external device may be a device that may perform communication with the UE 100, and is not limited to the aforementioned embodiment. The UE 100 may transmit and receive digital data such as contents by using the transmission module 110 and the reception module 110.

Also, as an example, the UE may serve as the seeker device. Also, the UE may serve as the advertiser device, as described above. At this time, according to one embodiment of the present specification, if the UE serves as the seeker device, the processor 120 of the UE 100 may perform discovery for the first service with the advertiser device. Afterwards, the processor 120 may form ASP session for the first service by performing connection with the advertiser device on the basis of the result of discovery which is performed. At this time, if the seeker device and the advertiser device are the first type devices, discovery and connection may be performed through at least any one of the plurality of interfaces supported by the ASPs of the seeker device and the advertiser device. On the other hand, if any one of the seeker device and the advertiser device is the first type device and the other one is the second type device, discovery and connection may be performed through the Wi-Fi Direct interface.

Also, as an example, the UE 100 may further include a Backward Compatibility Module (BC module) 140. At this time, the BC module may serve to support compatibility for the first type device and the second type device. For example, the BC module 140 may perform a mutual change between a service name of Wi-Fi Direct interface format and a service name of mDNS format. Also, the BC module 140 may support primitive for a legacy service considering an environment where the first type device and the second type device coexist, as described above.

The embodiments of the present invention may be achieved by various means, for example, hardware, firmware, software, or a combination thereof.

In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

And, both an apparatus invention and a method invention are explained in the present specification and the explanation on both of the inventions can be complementally applied, if necessary.

INDUSTRIAL APPLICABILITY

Although the aforementioned method for performing discovery by means of a UE in a wireless communication system has been described based on the P2P system, the aforementioned method is applicable to various wireless communication systems in addition to the P2P system.

What is claimed is:

1. A method for forming, by a seeker device, an application service platform (ASP) session with an advertiser device in a wireless communication system, the seeker device operating based on an ASP supporting a plurality of interfaces and the method comprising:

paging a SeekService method including a service name, wherein a service name format is mDNS (Multicast Domain Name System) format;

after paging the SeekService method, changing the service name format to Wi-Fi interface format based on mapping tables when a service is supported only in the Wi-Fi interface, wherein the mapping tables are used to change between Wi-Fi Direct Service (WFDS) service names and corresponding mDNS service names, converting the service name to a service hash value using a hash algorithm;

performing discovery restrictively for only a specific type of advertiser device associated with the service name format using the service hash value, wherein the specific type of advertiser device is a first type advertiser device or a second type advertiser device, wherein the first type advertiser device is a device operating based on an ASP supporting the plurality of interfaces, and wherein the second type advertiser device is a device operating based on an ASP supporting a Wi-Fi direct interface only, forming the ASP session for the service by performing connection with the first type advertiser device on a basis of a result of the performed discovery, based on any one of the plurality of interfaces supported by ASPs of the seeker device and the first type advertiser device, when the service name format is the mDNS format; and forming the ASP session for the service by performing connection with the second type advertiser device on the basis of the result of the performed discovery, based on the Wi-Fi Direct interface, when the service name format is changed to the Wi-Fi Direct interface format.

2. The method according to claim 1, wherein the desired service is one of send, play, display or print.

3. The method according to claim 1, wherein the seeker device includes a Backward Compatibility Module (BC module) performing mutual change between service name of the Wi-Fi Direct interface format and service name of the mDNS format, based on the mapping tables.

4. The method according to claim 3, wherein the BC module is located in an APS end of the seeker device.

5. A seeker device for forming an application service platform (ASP) session with an advertiser device in a wireless communication system, the seeker device comprising:

a receiver for receiving information from an external device;

a transmitter for transmitting information to the external device;

a processor for controlling the receiver and the transmitter and operating based on an ASP supporting a plurality of interfaces, wherein the processor:

pages a SeekService method including a service name, wherein a service name format is mDNS (Multicast Domain Name System) format;

after the pages the SeekService method, changes the service name format to Wi-Fi interface format based on mapping tables when a service is supported only in the Wi-Fi interface, wherein the mapping tables are used to change between Wi-Fi Direct Service (WFDS) service names and corresponding mDNS service names, converts the service name to a service hash value using a hash algorithm;

performs discovery restrictively for only a specific type of advertiser device associated with the service name format using the service hash value, wherein the specific type of advertiser device is a first type advertiser device or a second type advertiser device, wherein the first type advertiser device is a device operating based on an ASP supporting the plurality of interfaces, and wherein the second type advertiser device is a device operating based on an ASP supporting a Wi-Fi direct interface only, forms the ASP session for the service by performing connection with the first type advertiser device on a basis of a result of the performed discovery, based on any one of the plurality of interfaces supported by ASPs of the seeker device and the first type advertiser device, when the service name format is the mDNS format; and forms the ASP session for the service by performing connection with the second type advertiser device on the basis of the result of the performed discovery, based on the Wi-Fi Direct interface, when the service name format is changed to the Wi-Fi Direct interface format.

6. The seeker device according to claim 5, wherein the service is one of send, play, display or print.

* * * * *